United States Patent
Bloemenkamp et al.

(10) Patent No.: US 9,400,339 B2
(45) Date of Patent: Jul. 26, 2016

(54) APPARATUS AND METHOD FOR MEASURING ELECTRICAL PROPERTIES OF AN UNDERGROUND FORMATION

(75) Inventors: Richard Bloemenkamp, Issy-les-Moulineaux (FR); Andrew J. Hayman, Voisins-le-Bretonneux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 190 days.

(21) Appl. No.: 13/995,501

(22) PCT Filed: Dec. 7, 2011

(86) PCT No.: PCT/IB2011/055521
§ 371 (c)(1),
(2), (4) Date: Jul. 17, 2013

(87) PCT Pub. No.: WO2012/085725
PCT Pub. Date: Jun. 28, 2012

(65) Prior Publication Data
US 2013/0293235 A1  Nov. 7, 2013

(30) Foreign Application Priority Data
Dec. 20, 2010 (EP) ..................................... 10195925

(51) Int. Cl.
G01V 3/00 (2006.01)
G01V 3/20 (2006.01)
G01V 3/26 (2006.01)
G01V 3/24 (2006.01)

(52) U.S. Cl.
CPC .. G01V 3/20 (2013.01); G01V 3/00 (2013.01); G01V 3/24 (2013.01); G01V 3/26 (2013.01); G01V 3/265 (2013.01)

(58) Field of Classification Search
CPC .................................. G01V 3/20; G01V 3/26
USPC ......................................... 324/338, 367, 374
See application file for complete search history.

(56) References Cited

U.S. PATENT DOCUMENTS

| | | |
|---|---|---|
| 3,816,811 A | 6/1974 | Cmelik |
| 3,879,644 A | 4/1975 | Maltby |
| 4,511,842 A | 4/1985 | Moran et al. |
| 4,567,759 A | 2/1986 | Ekstrom et al. |
| 4,608,983 A | 9/1986 | Muller et al. |
| 4,857,852 A * | 8/1989 | Kleinberg et al. ............ 324/339 |
| 5,191,290 A | 3/1993 | Gianzero et al. |
| 5,457,396 A | 10/1995 | Mori et al. |
| 5,467,759 A | 11/1995 | Troncoso |
| 5,574,371 A | 11/1996 | Tabanou et al. |
| 5,677,631 A | 10/1997 | Reittinger et al. |

(Continued)

FOREIGN PATENT DOCUMENTS

| | | |
|---|---|---|
| EP | 0426563 | 5/1991 |
| WO | 2008/143616 | 11/2008 |

*Primary Examiner* — Reena Aurora
(74) *Attorney, Agent, or Firm* — Stephanie Chi (57) ABSTRACT

The present disclosure provides an apparatus and method for measuring electrical properties of an underground formation surrounding a borehole. The apparatus preferably comprises a downhole tool positionable in the borehole, a sensor pad positionable on the downhole tool, and a plurality of electrodes mounted on the sensor pad and configured to face a wall of the borehole. The apparatus further comprises an insulating layer extending over at least a portion of the plurality of electrodes facing the wall of the borehole.

17 Claims, 9 Drawing Sheets

(56) References Cited

U.S. PATENT DOCUMENTS

| | | |
|---|---|---|
| 6,191,588 B1 | 2/2001 | Chen |
| 6,527,923 B2 | 3/2003 | Kirk et al. |
| 6,801,039 B2 | 10/2004 | Fabris et al. |
| 6,891,377 B2 | 5/2005 | Cheung et al. |
| 6,919,724 B2 | 7/2005 | Cheung et al. |
| 7,066,282 B2 | 6/2006 | Chen et al. |
| 7,119,544 B2 | 10/2006 | Hayman et al. |
| 7,258,005 B2 | 8/2007 | Nyce |
| 7,382,136 B2 | 6/2008 | Hayman |
| 2003/0164705 A1 | 9/2003 | Cheung et al. |
| 2005/0006090 A1* | 1/2005 | Chemali et al. .......... 166/250.01 |
| 2007/0057674 A1 | 3/2007 | Chen et al. |
| 2008/0288171 A1 | 11/2008 | Itskovich et al. |
| 2009/0072833 A1 | 3/2009 | Tabarovsky |
| 2009/0090176 A1 | 4/2009 | Toribio et al. |
| 2009/0153155 A1 | 6/2009 | Chambon et al. |
| 2009/0204346 A1 | 8/2009 | Xie |

* cited by examiner

APPARATUS AND METHOD FOR MEASURING ELECTRICAL PROPERTIES OF AN UNDERGROUND FORMATION

BACKGROUND OF THE DISCLOSURE

The present invention relates to techniques for performing wellbore operations. More particularly, the present invention relates to techniques for determining downhole characteristics, such as electrical parameters of downhole fluids and/or subterranean formations.

Oil rigs are positioned at wellsites for performing a variety of oilfield operations, such as drilling a wellbore, performing downhole testing and producing located hydrocarbons. Downhole drilling tools are advanced into the earth from a surface rig to form a wellbore. Drilling muds are often pumped into the wellbore as the drilling tool advances into the earth. The drilling muds may be used, for example, to remove cuttings, to cool a drill bit at the end of the drilling tool and/or to provide a protective lining along a wall of the wellbore. During or after drilling, casing is typically cemented into place to line at least a portion of the wellbore. Once the wellbore is formed, production tools may be positioned about the wellbore to draw fluids to the surface.

During drilling, measurements are often taken to determine downhole conditions. In some cases, the drilling tool may be removed so that a wireline testing tool may be lowered into the wellbore to take additional measurements and/or to sample downhole fluids. Once the drilling operation is complete, production equipment may be lowered into the wellbore to assist in drawing the hydrocarbons from a subsurface reservoir to the surface.

The downhole measurements taken by the drilling, testing, production and/or other wellsite tools may be used to determine downhole conditions and/or to assist in locating subsurface reservoirs containing valuable hydrocarbons. Such wellsite tools may be used to measure downhole parameters, such as temperature, pressure, viscosity, resistivity, etc. Such measurements may be useful in directing the oilfield operations and/or for analyzing downhole conditions.

In some cases, techniques have been generated for determining parameters of the formations surrounding the borehole. For example, micro-resistivity measurements of borehole walls are taken to generate images of formations surrounding the borehole. Such micro-resistivity measurements may be taken using downhole tools, such as a Fullbore Micro Imager (FMI™) of SCHLUMBERGER™ and an Earth Imager™ of BAKER ATLAS™. In another example, measurements may be taken using current injection when the borehole is filled with a conductive fluid or mud. Where a non-conductive fluid is present, such as oil-based mud (OBM) with a very high resistivity compared to that of the formation, such that a thin layer of mud between a measurement electrode and the formation results in high impedance between the electrode and the formation. Another example mounts one or more button voltage electrodes on an insulating pad, such as is used in the Oil Base Micro Imager tool (OBMI™) of SCHLUMBERGER™.

Stability problems may sometimes occur in cases where a measurement electrode touches the formation or if the mud has conductive bubbles in it which form a low-impedance electrical connection between the measurement electrode and the formation. High impedance between the electrode and the formation can suddenly reduce to very small impedance or vice versa, which may lead to a change in the measurement that is not due to a change in formation properties. For example a small change from 0.1 mm to 0 mm mud thickness can lead to a significant change in impedance. In general, both the magnitude and the phase of the impedance can change drastically.

It may be desirable in some cases to provide a minimum distance or stand-off between a measurement pad and the borehole wall. Attempts have been made to provide protruding elements, for example protruding wear plates, on the sensor pad to touch the formation and keep the pad's front face away from the formation. However, protruding devices may be subject to damage in downhole conditions, and may still have problems with measurements where conductive bubbles are present in the mud.

Various techniques have been developed for measuring downhole parameters as described, for example, in U.S. Patent/Application Nos. 20090204346, 20090153155, 20090072833, 20090090176, 20080288171, 7,258,005, 5,457,396, 6,527,923, 7,066,282, 6,801,039, 6,191,588, 6,919,724, 7,382,136, 6,891,377, 7,119,544, 5,677,631, 5,467,759, 5,574,371, 6,801,039, 4,608,983, 4,567,759, 3,879,644, and 3,816,811.

Despite the development of techniques for measuring downhole parameters, there remains a need to provide advanced techniques for determining parameters of downhole formations and/or wellbore fluids. It may be desirable to provide techniques that enhance downhole fluid and/or downhole formation measurements. It may be further desirable to provide techniques that minimize a distance between a sensor pad and a formation in a wellbore. Such techniques are preferably capable of eliminating the sensor pad's direct contact with the formation and/or a highly conductive bubbles in the mud. Preferably, such techniques involve one or more of the following, among others: accuracy of measurements, optimized measurement processes, reduced clogging, minimized components, reduced size, increased surface area for measurement, constant flow of fluids during measurement, optimized shape of measurement apparatus/system, real time capabilities, compatibility with existing wellsite equipment, operability in downhole conditions (e.g., at high temperatures and/or pressures), etc.

SUMMARY OF THE DISCLOSURE

According to an aspect of the present disclosure, one or more embodiments relate to an apparatus for measuring electrical properties of an underground formation surrounding a borehole. The apparatus preferably comprises a downhole tool positionable in the borehole, a sensor pad positionable on the downhole tool, and a plurality of electrodes mounted on the sensor pad and configured to face a wall of the borehole. The apparatus further comprises an insulating layer extending over at least a portion of the plurality of electrodes facing the wall of the borehole.

In at least one embodiment, the plurality of electrodes of the apparatus may be configured to couple capacitively to the formation to measure its electrical properties. Moreover, the plurality of electrodes may be mounted in a blind hole formed in the sensor pad. The plurality of electrodes may comprises at least one button electrode and at least one return electrode with an optional source electrode and/or a guard electrode. As an example, the at least one button electrode may be less than two centimeters in diameter. The plurality of electrodes may comprise a series of interconnected spaced sub-electrodes configured to operate as a single electrode.

Further, a wear plate may be provided for maintaining a minimum standoff between the sensor pad and the wall of the borehole. Even further, the insulating layer may be formed by depositing an insulating material over at least a portion of the plurality of electrodes, or by modifying the surface properties of the plurality of electrodes to become insulating. The insulating layer may comprise a face of the sensor pad formed from an insulating material. Where the plurality of electrodes comprises at least one button electrode and at least one return electrode, the insulating layer may extend over a substantial portion of the at least one button electrode facing the wall of the borehole. Where the plurality of electrodes comprises a series of interconnected spaced sub-electrodes configured to operate as a single electrode, the insulating material may extend between the series of interconnected spaced sub-electrodes. The insulating material may have different thicknesses depending on the nature of the sub-electrode. As an example, the insulating layer may have a thickness of not more than 3 mm.

According to another aspect of the present disclosure, one or more embodiments relate to the apparatus for measuring electrical properties of an underground formation as described herein, wherein the downhole tool is either a wireline tool and/or a logging while drilling tool. As an example, the downhole tool may be selected from the group consisting of a mandrel, a standoff keeper, a fin, a skid, and a stabilizer.

According to another aspect of the present disclosure, one or more embodiments relate to a method for measuring the electrical properties of an underground formation surrounding a borehole. The method preferably comprises the steps of positioning a downhole tool with a sensor pad thereon in the borehole, the sensor pad having insulation thereon; positioning the sensor pad in the borehole adjacent a wall of the borehole, the sensor pad having a plurality of electrodes for measuring the electrical properties of the formation mounted in the insulation on the sensor pad and configured to face the wall of the borehole, and having an insulating layer extending over at least a portion of the plurality of electrodes facing the wall of the borehole; and configuring at least one of the plurality of electrodes to measure the electrical properties of the formation through the insulating layer.

The method may further comprise the step of configuring at least one of the plurality of electrodes to couple capacitively to the formation to measure the electrical properties of the formation. In addition, the method may further comprise using the apparatus for measuring electrical properties of an underground formation as described herein.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawing. Accordingly, the drawings and description are to be regarded as illustrative in nature, and not restrictive.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

The description that follows includes exemplary apparatus, methods, techniques, and instruction sequences that embody techniques of the present inventive subject matter. However, it is understood that the described embodiments may be practiced without these specific details. Presently preferred embodiments of the disclosure are shown in the above-identified Figures and described in detail below.

Figure 1:
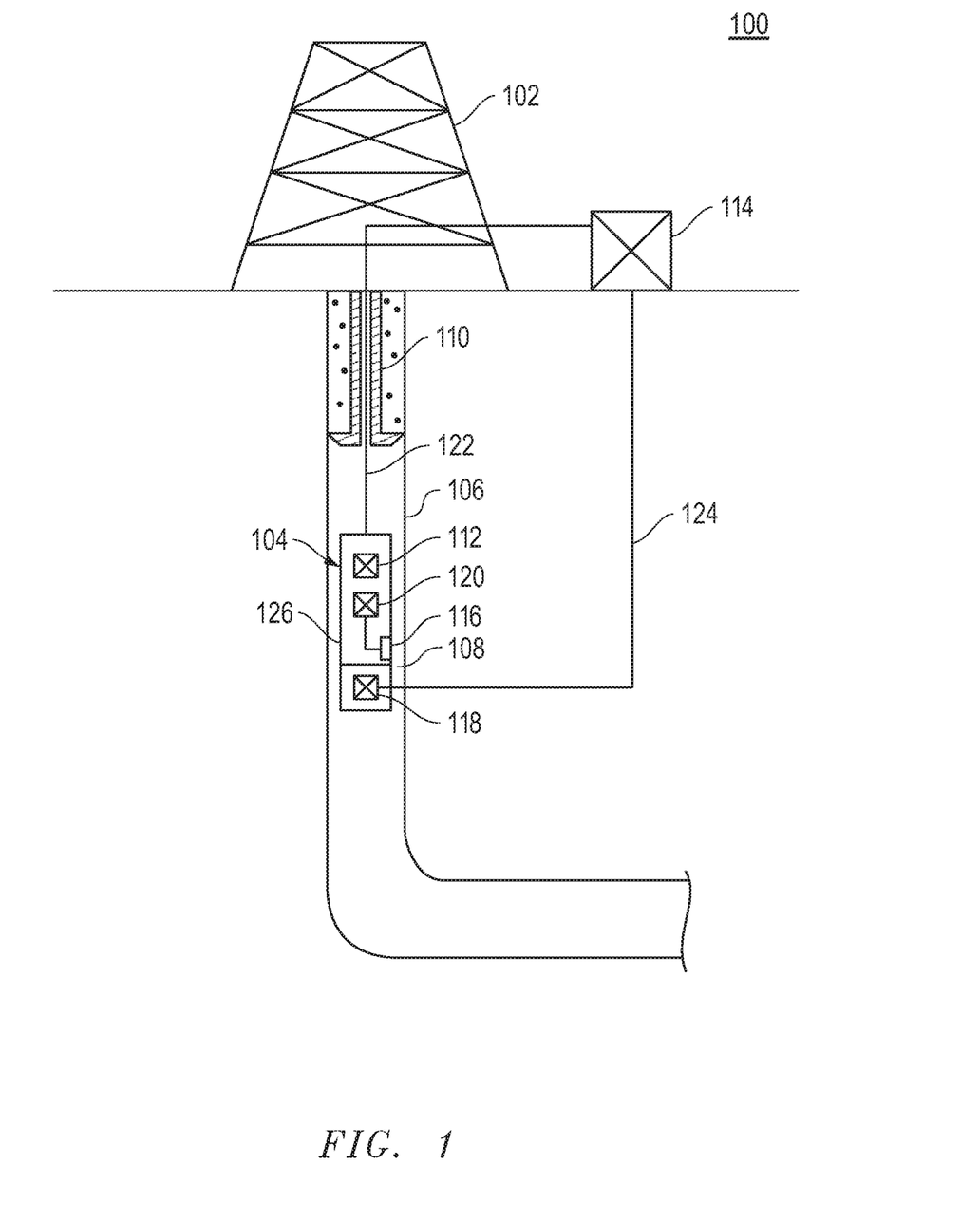
FIG. 1 is a schematic view of a system for measuring (e.g., electrical) properties of an underground formation comprising a downhole tool positioned in a wellbore and a sensor pad on the downhole tool for determining downhole parameters.

FIG. 1 is a schematic view of a wellsite 100 having an oil rig 102 with a downhole tool 104 suspended into a wellbore 106 therebelow. The wellbore 106 has been drilled by a drilling tool (not shown). A drilling mud, and/or a wellbore fluid 108, may have been pumped into the wellbore 106 and may line a wall thereof. As shown, a casing 110 has also been positioned in a portion of the wellbore 106 and cemented into place therein. The downhole tool 104 may include one or more sensors for determining one or more downhole parameters, such as wellbore fluid parameters, wellbore integrity parameters and/or formation parameters.

The downhole tool 104 is shown as a wireline logging tool lowered into the wellbore 106 to take various measurements. The downhole tool 104 may include a conventional logging device 112, a sensor pad 116, one or more telemetry devices 118, and an electronics package 120. The conventional logging device 112 may be provided with various sensors, measurement devices, communication devices, sampling devices and/or other devices for performing wellbore operations. For example, as the downhole tool 104 is lowered, it may use devices, such as resistivity or other logging devices, to measure formation parameters and/or properties.

As shown, the downhole tool 104 may be conveyed into the wellbore 106 on a wireline 122. Although the downhole tool 104 is shown as being conveyed into the wellbore 106 on a wireline 122, it should be appreciated that any suitable conveyance may be used, such as a slick line, a coiled tubing, a drill string, a casing string and the like. The downhole tool 104 may be operatively connected to a surface unit 114 for communication therebetween. The downhole tool 104 may be wired via the wireline 122, as shown, and/or wirelessly linked via the one or more telemetry devices 118. The one or more telemetry devices 118 may include any telemetry devices, such as electromagnetic devices, for passing signals to a surface unit 114 as indicated by communication links 124. Further, it should be appreciated that any communication device or system may be used to communicate between the downhole tool 104 and the surface unit 114. Signals may be passed between the downhole tool 104 and the surface unit 114 and/or other locations for communication therebetween. The downhole tool 104 may include a mandrel, a standoff keeper, a fin, a skid, and a stabilizer.

While the downhole tool 104 is depicted as the wireline tool 104 having the sensor pad 116 thereon, it will be appreciated that the sensor pad 116 may be positioned downhole on a variety of one or more tools. For example, the sensor pad 116 may be placed downhole on a drilling string, coiled tubing, drill stem tester, production, casing, pipe, or other downhole tool. Although only one sensor pad 116 is shown, it should be appreciated that one or more sensor pads 116 and/or portions of the sensor pads 116 may be located at several locations in the wellbore 106. The sensor pad 116 is preferably positioned about an outer surface of the downhole tool 104 so that the downhole fluid and/or the formation may pass therealong for measurement thereof. However, it will be appreciated that the one or more sensors 116 may be positioned at various locations about the wellsite 100 as desired for performing fluid measurement. Further, the sensor pad(s) 116 may be located on the downhole tool 104 with a mandrel, a standoff keeper, a fin, a skid, a stabilizer and the like.

The electronics package 120 may include any components and/or devices suitable for operating, monitoring, powering, calculating, calibrating, and analyzing components of the downhole tool 104. Thus, the electronics package 120 may include a power source, a processor, a storage device, a signal conversion (digitizer, mixer, amplifier, etc.), a signal switching device (switch, multiplexer, etc.), a receiver device and/or a transmission device, and the like. The electronics package 120 may be operatively coupled to the sensor 116. The power source in the electronics package 120 may apply a voltage to the sensor 116. The power source may be provided by a battery power supply or other conventional means of providing power. In some cases, the power source may be an existing power source used in the downhole tool 104. The power source may be positioned, for example, in the downhole tool 104 and wired to the sensor 116 for providing power thereto as shown. Optionally, the power source may be provided for use with the sensor 116 and/or other downhole devices. Although the electronics package 120 is shown as one separate unit from the sensor 116, it should be appreciated that any portion of the electronics package 120 may be included within the sensor 116. Further, the components of the electronics package 120 may be located at various locations about the downhole tool 104, the surface unit 114 and/or the wellsite 100. The sensor 116 may also be wired or wirelessly connected to any of the features of the downhole tool 104, and/or surface unit 114, such as communication links, processors, power sources or other features thereof.

The sensor pad 116 may be capable of determining one or more downhole fluid parameters and/or one or more formation parameters. The downhole fluids may include any downhole fluids such as downhole mud (e.g., oil based), hydrocarbons, water and/or other downhole fluids. The sensor pad 116 may determine the downhole parameters of the downhole fluids and/or the downhole formations as the downhole tool 104 passes through the wellbore 106. Due to the harsh conditions of the downhole environment, the sensor pad 116 may be positioned on the downhole tool 104 in such a manner that the sensor pad 116 is capable of measuring fluids and/or downhole formations as the downhole tool 104 passes through the wellbore 106. Further, the sensor pad 116 may be positioned in such a manner that reduces clogging of downhole fluids as the downhole fluids pass the sensor pad 116. As shown, the sensor pad 116 is positioned on an outer surface 126 of the downhole tool 104. The sensor pad 116 may have an insulating layer covering one or more electrodes in the sensor pad 116 as will be described in more detail below. The sensor pad 116 may be flush with an outer surface 126 of the downhole tool 104. Further, the sensor pad 116 may be recessed a distance below the outer surface 126 to provide additional protection thereto, or protruded a distance therefrom to access fluid and/or formation. The sensor pad 116 may also be positioned at various angles and locations as desired.

Figure 2A:
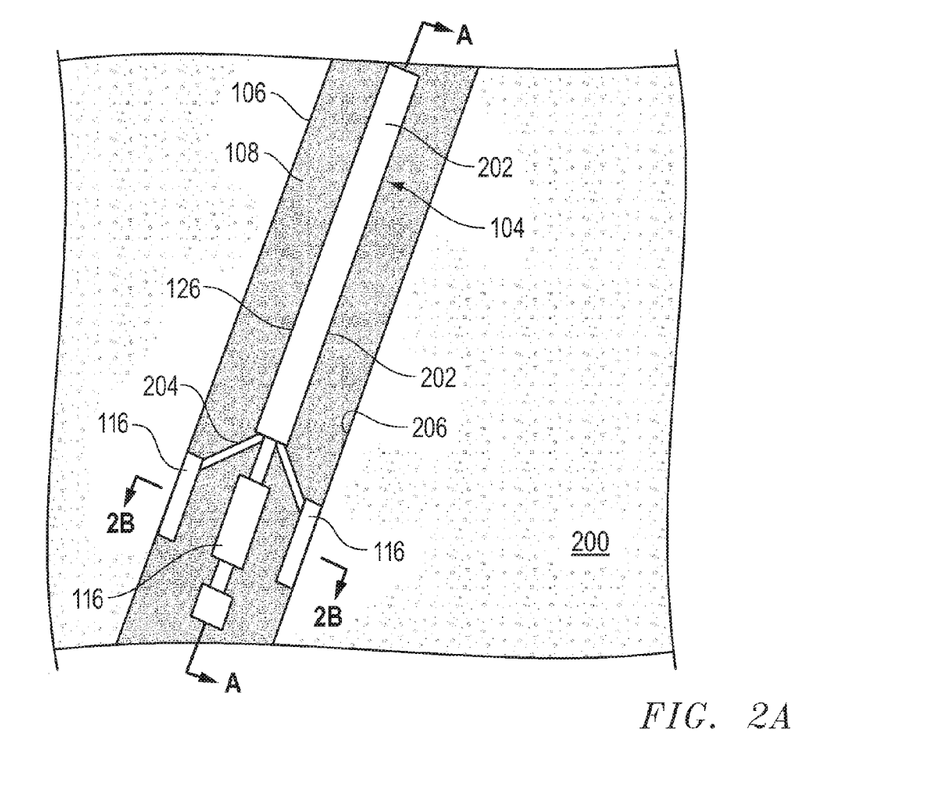
FIG. 2A is a schematic view of a portion of a downhole tool with a pad with a sensor pad thereon.

FIG. 2A shows a schematic view of a downhole tool usable as the downhole tool 104 located in the wellbore 106 and within a downhole formation 200. As depicted, the downhole tool 104 is a wireline microresistivity tool containing the sensor pads 116. The sensor pads 116 may be located on the outer surface 126 (as shown in FIG. 1), or located on one or more arms 204 which extend from downhole tool 104. The arms may be configured to place the sensor pads 116 as close to the formation wall 206, or against a mud layer on the formation wall 206, as possible. Thus, the arms 204 may be actuatable, or spring loaded in order to bias the sensor pads 116 against the formation wall 206.

Figure 2B:
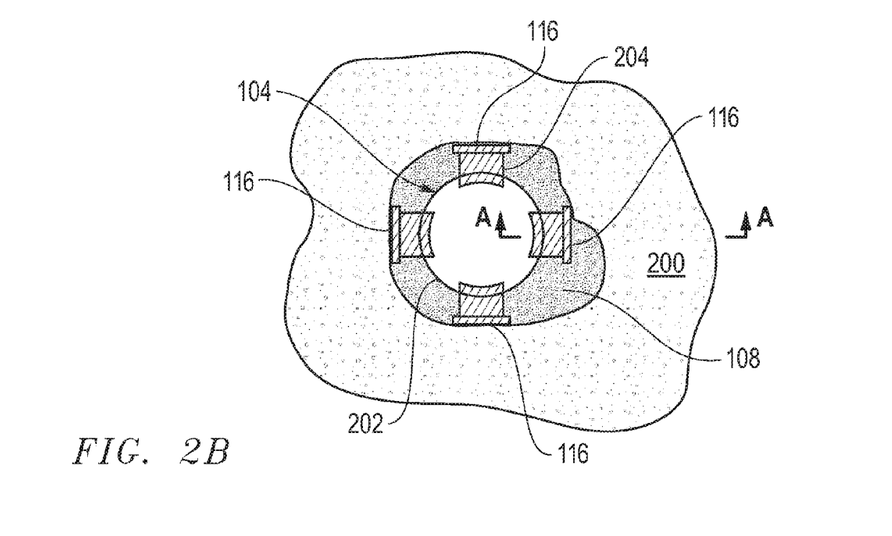
FIG. 2B is a horizontal cross-sectional view of the downhole tool of FIG. 2A taken along line 2B-2B.

FIG. 2B shows a horizontal cross-sectional view of the downhole tool 104 in FIG. 2A taken along line 2B-2B. As shown, the downhole tool 104 may include multiple sensor pads 116 located around a tool mandrel 202. Each of the sensor pads 116 may be configured to measure the parameters of the downhole fluid and/or parameters of the formation 200.

Figure 3:
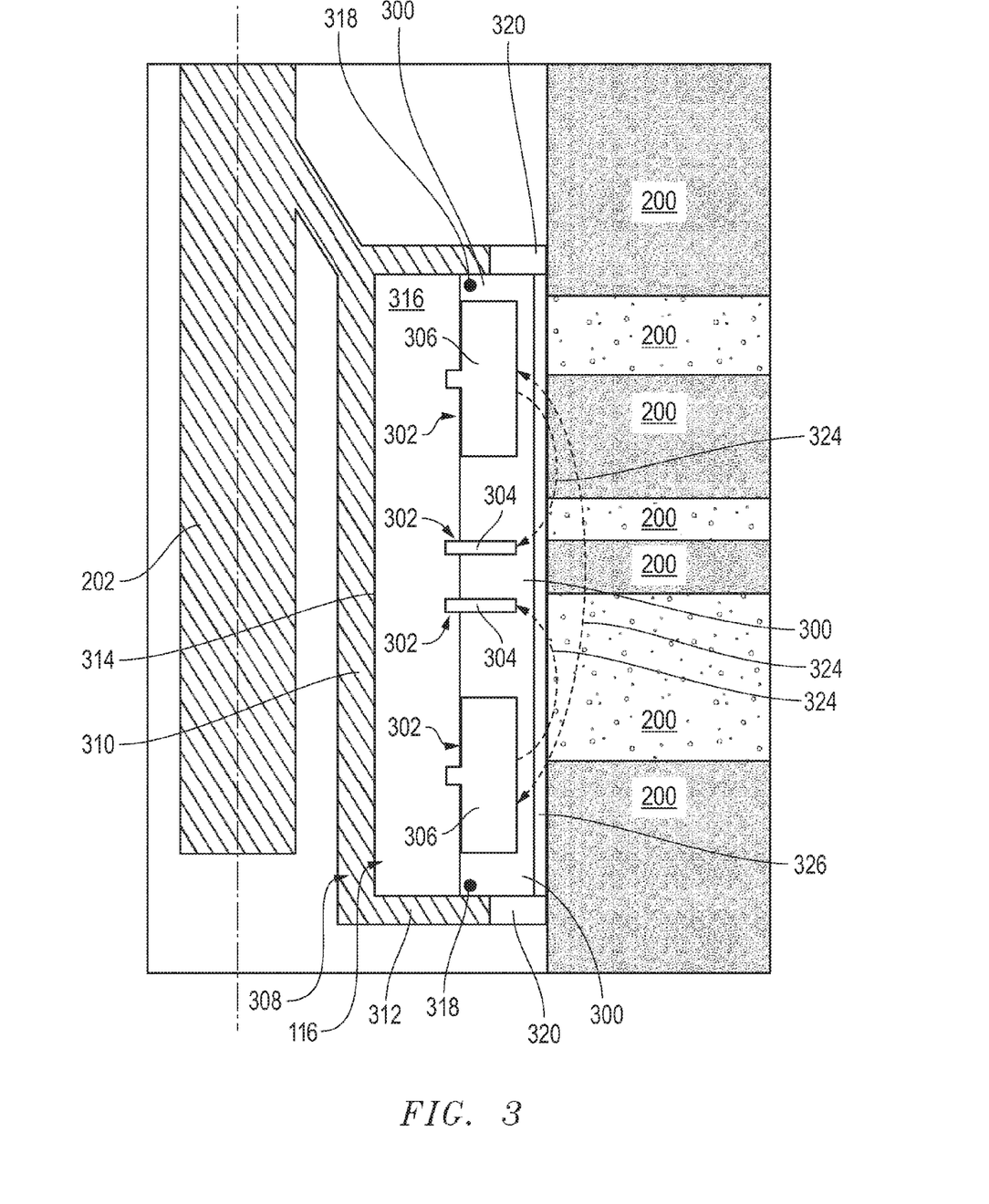
FIG. 3 is a cross-sectional view of a portion of the downhole tool of FIG. 2A taken along line A-A, depicting a pad.

FIG. 3 shows the sensor pad 116 attached to the mandrel 202. The sensor pad 116 may be used for measuring electrical properties of the formation layers 200 in a hydrocarbon well, or wellbore 106. The sensor pad 116 may comprise an insulating layer 300, or insulating front face, covering an arrangement of electrodes 302. The electrodes 302 may comprise one or more button electrodes 304 and one or more source electrodes 306 (or return electrodes). Each of the electrodes 302 may be held in place with conventional fixture mechanisms, such as screws, glue, epoxy, locking means, press-fitting, or the like. An insulating layer 300 may cover the entire front face of the sensor pad 116 thereby covering and sealing the electrodes 302. The button electrodes 304 may have any suitable diameter. In one example, the button electrodes 304 are less than or equal to 2 cm in diameter.

The insulating layer 300 may further extend down a portion of the sides of the sensor pad 116. The sensor pad 116 may be held by a tool pad 308. As shown in FIG. 3, the tool pad 116 may have a tool pad base 310 and one or more tool pad walls 312. The sensor pad 116 may include a sensor pad base 316. The sensor pad base 316 may be configured to secure the electrodes 302 and the insulating layer 300 to the tool pad 308. A back face 314 of the sensor pad 116 and/or sensor pad base 316 may be located proximate and/or secured to the tool pad base 310. The sensor pad base 316 may adhere to the tool pad 308 using any conventional means.

As shown in FIG. 3, the sensor base pad 316 may extend partially along the one or more pad walls 312. A portion of the insulating layer 300 extending along the side of the sensor pad 116 may meet the sensor pad base 316 within the one or more pad walls 312. Because the insulating layer 300 completely covers the electrodes 302, only a perimeter between the insulating layer 300 and the sensor pad base 316 may need to be sealed in order to seal the electrodes 302 from wellbore fluids, as will be described in more detail below.

The insulating layer 300 and/or the sensor pad base 316 may be any suitable insulating material, such as PEEK, capable of impeding and/or stopping current flow. Although described as PEEK, it should be appreciated that the insulating layer 300 and/or the sensor pad base 316 may be any suitable material for impeding or stopping current including, but not limited to, Sapphire, ceramics, polymide resin, plastic, and the like.

A seal 318, perimeter seal, or O-ring, may be used for sealing the sensor pad 116 from unwanted borehole fluids. The sensor pad 116 may also incorporate one or more wear plates 320. The one or more wear plates 320 may ensure some standoff between the formation 200 and the electrodes 302. Further the one or more wear plates 320 may prevent the electrodes 302 and/or the insulating layer 300 from touching the formation 200, and/or being damaged or worn by the formation 200. The wear plates 320 may extend a distance beyond the face of the insulating layer 300 toward the formation 200 to protect the insulating layer 300 and/or the electrodes 302. Further, because the insulating layer 300 protects the electrodes 302, the wear plates 320 may be flush with an outer face of the insulating layer 300, and/or be slightly recessed from the outer face. The wear plates 320 may maintain a minimum standoff between the insulating layer 300 of the sensor pad 116 and the formation wall 206.

The seal 318 may seal the electrodes 302 and any electronics from of the sensor pad 116 from the borehole environment. The seal 318 may be accomplished using one perimeter seal between the sensor base pad 316, the insulating layer 300 and an interior of the one or more pad walls 312. Although, the seal 318 is shown as an O-ring, it may be any suitable device for sealing the interior of the sensor pad 116.

Figure 4:
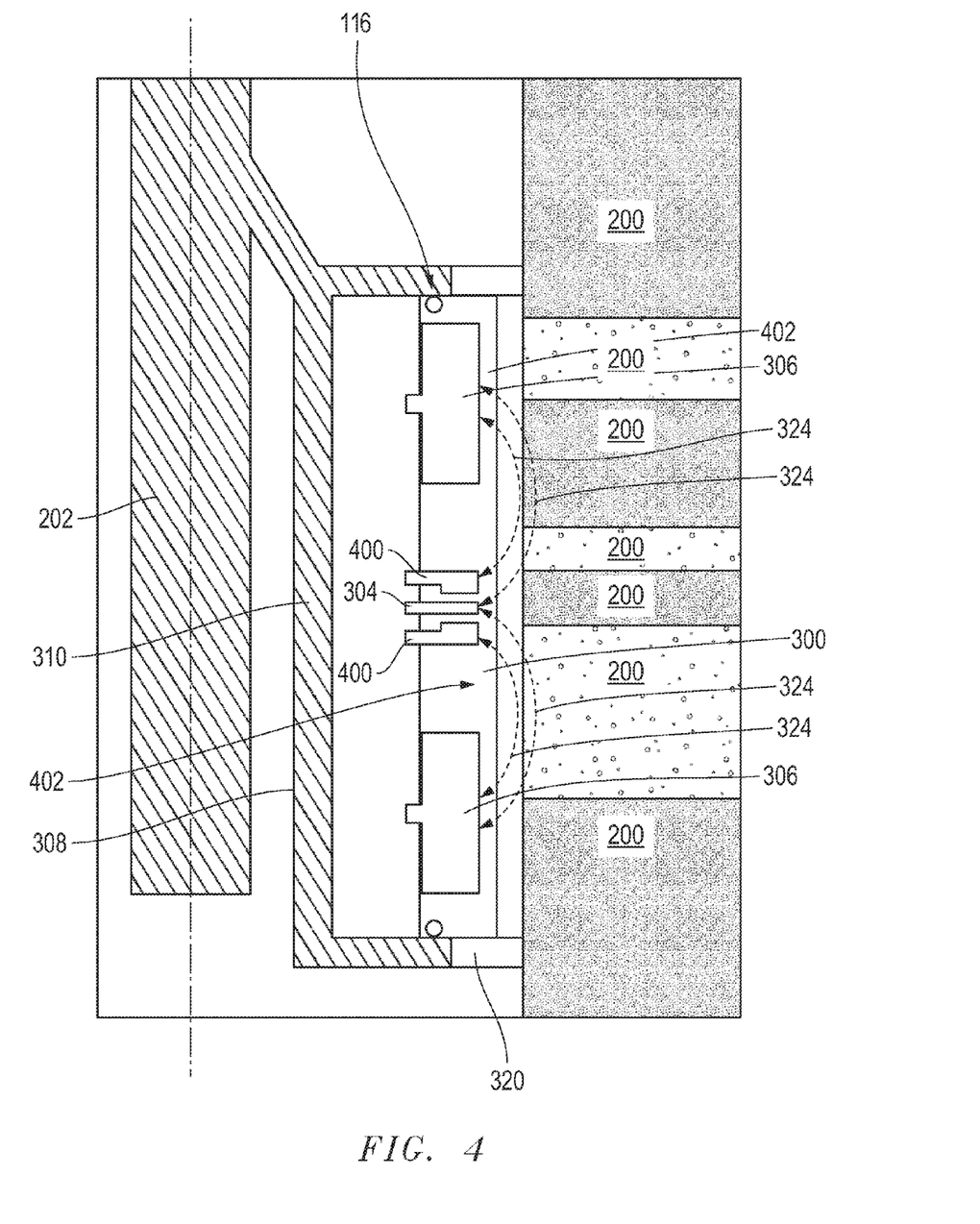
FIGS. 4 and 4B are cross-sectional views of a portion of the downhole tool of FIG. 2A taken along line A-A, depicting alternate pads.

FIGS. 3 and 4 show the sensor pad having the insulation layer 300, or the front face, extending over all of the electrodes 302. FIG. 4 shows the sensor pad 116 of FIG. 3 having one or more guard electrodes 400. The electrodes 302 may be secured to the insulating layer 300 in the manner described below. While at least a portion of the sensors pads may have electrodes mounted into the front face, as shown in FIGS. 3 and 4, the insulating layer 300 (or the front face) may cover the electrodes 302. The electrodes 302 may optionally be completely covered with the insulating layer 300 to help eliminate the need for the individual electrode mounting to seal against borehole fluid entry.

The electrodes 302 may form a circuit which may include one or more source electrodes 306 (or returns), and the button electrodes 304 (or sensor electrode). Between the source electrodes 306 and the button electrodes 304 there may be insulating material. As shown, the insulating material is part of the insulating layer 300. The electrodes 302 are communicatively linked to the electronics package 120 (FIG. 1). The electrodes 302 may be arranged in a variety of configurations, and should not be limited to the configuration shown in the drawings, primarily depending on the parameters to be measured by the downhole tool 104.

The button electrodes 304 may be used to measure a voltage with respect to a ground, or another electrode 302, and/or may be used to measure a current 324 between at least one of the source electrodes 306 and the button electrodes 304. From the voltage and the current electrical properties, or parameters, measured via the button electrodes 304, various downhole parameters of, for example, the wellbore fluid and/or the formation may be determined. The electrical properties may include conductivity and permittivity. In certain applications, the button electrodes 304 may measure the amplitude and phase of the voltage and the current 324. From the amplitude and phase of the voltage and the current 324, the complex impedance may be calculated for the wellbore fluid and/or the formation. With the complex impedance known, various electrical properties may be calculated.

In another example, the button electrodes 304 may be used to measure the amplitude of the voltage and the current 324. From the amplitude of the voltage and the current 324, the impedance amplitude may be calculated. With the impedance amplitudes known electrical properties such as absolute conductivity and impedivity may be calculated. In another example, the button electrodes 304 may be used to measure the phase of the voltage and the current 324. From phase of the voltage and the current 324, the impedance phase may be calculated. With the impedance phase known the ratio of conductivity and permittivity may be calculated. Measurements taken via the button electrodes 304 may be taken at several frequencies to optimize response.

The source (or return) electrode(s) 306, and possibly the button (or sensor) electrode(s) 304 may be any conventional electrode capable of generating a current 324 across a fluid 326 and/or formation 200 with measurable effects. A power source (e.g., included in the electronics package 120 of FIG. 1) may be operatively connected to the electrodes 302 for applying a voltage thereacross. As voltage is applied, the current 324 flows out of one of the electrodes 302, for example the source electrodes 306 that can be measured by the button electrodes 304. The source electrodes 306 and the button electrodes 304 may be geometrically and materially optimized to match substantially to a fixed characteristic impedance transmission line.

The current 324 from the electrodes may be used to determine various parameters. In an example involving a fluid passing between a pair of electrodes, an AC voltage V is applied between two electrodes to generate a resultant current I that can be measured at the sensor electrode, for example the mud button or the formation button. The complex impedance Z may be determined from the measured current I based on the following:

$$Z = |Z|\exp(i\phi_z) \qquad \text{Equation (1)}$$

where its magnitude $|Z|$ based on Ohms law and phase $\phi_z$ are defined as follows:

$$|Z| = |V/I| \qquad \text{Equation (2)}$$

$$\phi_z = \text{phase of I relative V} \qquad \text{Equation (3)}$$

and where $\exp(i\phi_z)$ based on Euler's formula is defined as follows:

$$\exp(i\phi_z) = \cos\phi_z + i\sin\phi_z \qquad \text{Equation (4)}$$

The magnitude and phase of the impedivity (sometimes referred to as the complex impedivity) of a fluid $\zeta$ is defined as follows:

$$\zeta = |\zeta|\exp(i\phi_\zeta) \qquad \text{Equation (5)}$$

Equation (5) may be derived from Z by the relations as follows:

$$|\zeta| = k|Z| \qquad \text{Equation (6)}$$

Equation (6) may also he written as follows:

$$|\zeta| = k|V|/|I| \qquad \text{Equation (7)}$$

The phase (or dielectric angle) of the fluid $\zeta$ is derived as follows:

$$\phi_\zeta = \phi_z \qquad \text{Equation (8)}$$

where:
  $|\zeta|$ is the magnitude of impedivity,
  $\phi_\zeta$ is the phase angle of impedivity, and
  k is a constant for the device.

The constant k may be measured empirically, for example, by measuring the impedance V/I between electrodes as a fluid of known impedivity is passed therethrough. The constant k may also be calculated from the geometry of the electrodes using conventional methods.

Data concerning the measured current may be used to determine fluid parameters, such as impedivity, resistivity, impedance, conductivity, complex conductivity, complex permittivity, tangent delta, and combinations thereof, as well as other parameters of the wellbore fluid. The data may be analyzed to determine characteristics of the wellbore fluid, such as the type of fluid (e.g., hydrocarbon, mud, contaminants, etc.) A processor (e.g., located in the logging device 112, the electronics package 120 of FIG. 1) may be used to analyze the data. Optionally, the data may be communicated to the surface unit 114 and/or other location for storage and/or analysis. Such analysis may be performed with other inputs, such as historical or measured data about this or other wellsites. Reports and/or other outputs may be generated from the data. The data may be used to make decisions and/or adjust operations at the wellsite. In some cases, the data may be fed back to the wellsite for real-time decision making and/or operation.

The electrodes 302 may couple capacitively through the insulating layer 300, or insulating surface, then through the fluid 326, or mud, and into the formation 200. While electrode-formation coupling may be reduced because another capacitor (the insulating layer 300) has been added to the series with the existing mud impedance. The insulating layer 300 may be used to handle rapid and relatively large impedance changes between the electrodes 302 and the formation 200 by preventing the electrodes 302 from touching the formation 200, or where there are conductive paths through the mud is also reduced.

The thickness of the insulating layer 300 may be between about 0.25 mm and 5 mm. Further the thickness of the insulating layer 300 may be between about 1 mm and 2.5 mm. The thinner the insulating layer 300 may be used to provide smaller the minimum standoff (for example, when the face is in contact with the borehole wall). A smaller standoff may lead to a higher measurement image resolution. A higher measurement signal may be used to generate better signal to noise ratio (where noise includes thermal noise and other spurious signals). A thicker insulating layer 300 may be used to provide more stable capacitive coupling between the electrodes 302 and the formation 200, and, therefore more stable measurements. Furthermore, the thicker insulating layer 300 may be used to provide strength and resistance to wear over time. A thicker insulating layer 300 may also be used to prevent fracture and loss of sealing capabilities.

Figure 4B:
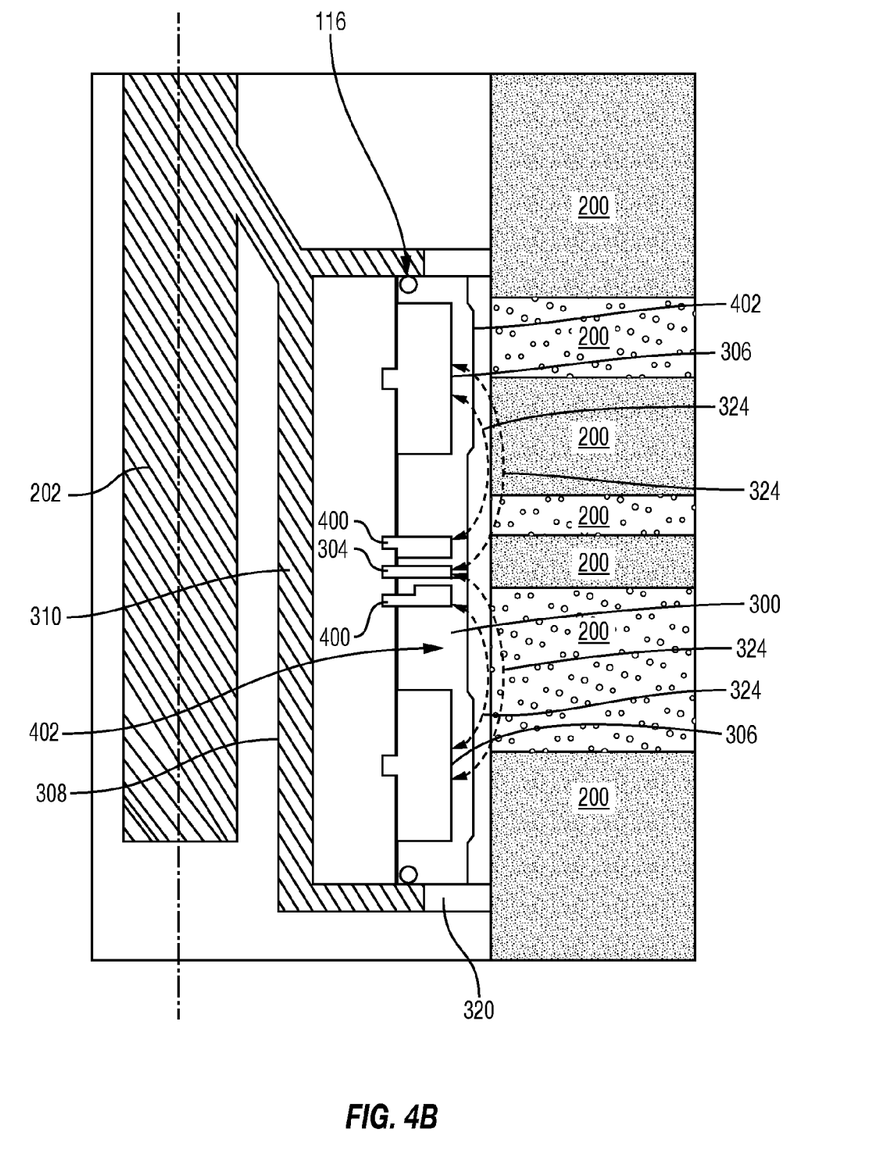

The thickness of the insulating layer 300 may vary over certain areas of the sensor pad 116. As shown in FIG. 4B, the thickness of the insulating layer 300 is greater in front of sensor electrodes 306 than the thickness of the insulating layer 300 in front of the electrodes 302 and 400. For example, the thickness range of the insulating layer 300 may be about 1 to 2.5 mm in front of the button electrodes 304 and up to an extra 1 mm, or between about 1 to 3.5 mm in front of the sensor electrodes 306. An insulating layer 300 thickness of at least about 2 to 3 mm may prevent fracturing, breaking and/or wearing off of the insulating layer 300 during downhole operations. The minimum thickness can be a function of the diameter of the electrodes 302. For example, the thickness of the insulating layer 300 in front of an electrode 302 having a large surface area on the face of the sensor pad 116 and the thickness of the insulating layer 300 may be greater than in front of an electrode 302 having a small surface area on the face of the sensor pad 116. The changing of the insulating layer 300 thickness may prevent premature fracturing, breaking and/or wearing of the insulating layer 300.

For the high-frequency microresistivity imaging, the insulating layer 300 thickness in front of the guard electrodes 400 and button electrodes 304 may be important, whereas the layer thickness in front of the sensor electrodes 306 may be less significant. However, the insulating layer 300 thickness in front of the sensor electrodes 306 may be similar to the insulating layer 300 thickness in front of the button electrodes 304 and the guard 400.

Figure 5:
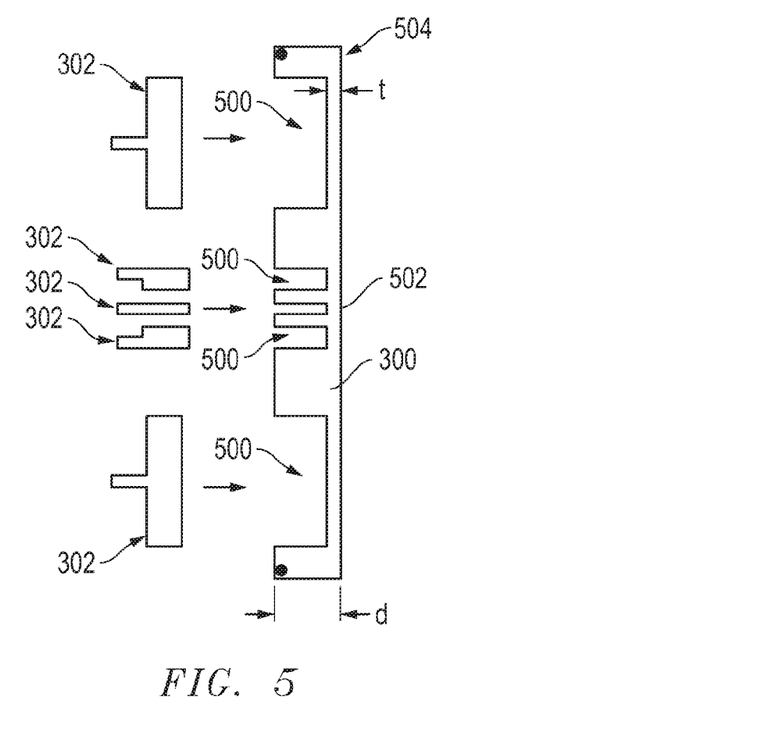
FIG. 5 is an exploded cross-sectional view of the sensor pad of FIG. 3.

Referring now to FIG. 5, the insulating layer 300 comprising a front portion 402, or front face, of the sensor pad 116 may be formed from an insulating material, as discussed above. The front portion 402 may be constructed from insulating material. The insulating layer 300 may be constructed with one or more blind holes 500. The blind holes 500 may be formed for housing a portion, and/or all of the electrodes 302 (such as the sensor electrode(s) 306, the button electrodes 304 and/or the guard electrodes 400). The electrodes 302 may be mounted in blind holes 500 formed in the sensor pad 116 during assembly. The method of construction of these sensor pads 116 is shown in FIG. 5. The borehole wall 502 facing plane of the front face 402 of the insulating layer 300 is shown as a complete surface without holes for the electrodes 302.

FIG. 5 shows detail of the construction of the sensor pad 116 having the electrodes 302 and front face 402 of the insulating layer 300. In FIG. 5, the blind holes 500 are formed in the front face 402 of the insulating layer 300. The forming of the blind holes 500 may leave a base section 504 of the insulating layer 300 with the required thickness t. The required thickness is a thickness that allows the electrodes to send/receive current through the insulating layer 300 in order to measure electrical properties. The electrodes 302 may then be inserted into the blind holes 500 so as to seat against the base section 504. The blind holes 500 may be drilled in the front face 402 of the insulating layer 300, or formed by any suitable method such as by molding, cutting, and the like. Each of the blind holes 500 may vary in depth D depending on the required thickness t of the insulating layer 300 in front of the respective electrodes 302.

The blind holes 500 may house any of the electrodes 302 behind the front face 402 of the insulating layer 300. Thus, the blind holes 500 address problems found in the prior art. First, the thin insulating layer 300 prevents the electrodes 302 from touching the formation layer 200, as shown in FIG. 3. Second, conductive bubbles in the fluid 326, or mud, may no longer form low impedance paths between the electrodes 302 and the formation 200. Finally, the mechanical sealing issues associated with holes that extend all the way through the sensor are avoided.

Figures 6, 7:
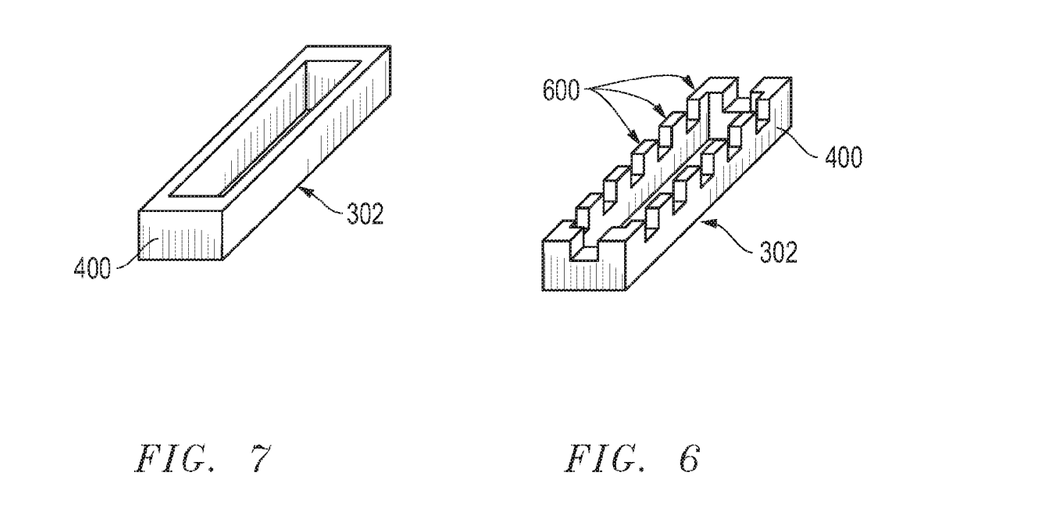
FIG. 6 is a perspective view of a multi guard electrode.
FIG. 7 is a perspective view of a ring guard electrode.

FIG. 6 shows a perspective view of the electrode 302 of FIG. 5. Each of the electrodes 302 extending into the blind holes 500 and contacting the insulating layer 300 may be a solid electrode, as shown in FIG. 5. However, if the electrode 302 is a large electrode, the electrode 302 may be a multi guard electrode broken up into smaller sub-electrodes 600 that contact the insulating layer 300 as shown in FIG. 6. Therefore, each of the electrodes 302 may comprise a series of interconnected spaced sub-electrodes 600 electrically linked together, for example at an anterior portion of the sensor pad 116. Large, thin insulating layers 300 on large electrode 302 surfaces may be vulnerable to breaking, wearing, tearing and the like. Therefore, it may be useful to break up large electrodes 302 proximate the insulating layer 300 into the sub electrodes 600 which are linked together. The button electrodes 306 may already be relatively small and, therefore, are less likely to benefit from sub-division. However, the guard electrode 700, as shown in FIG. 7, is often in the form of a metal ring. The guard electrode 700 may be sub-divided into several the sub electrodes 600 as shown in FIG. 6.

Figure 8:
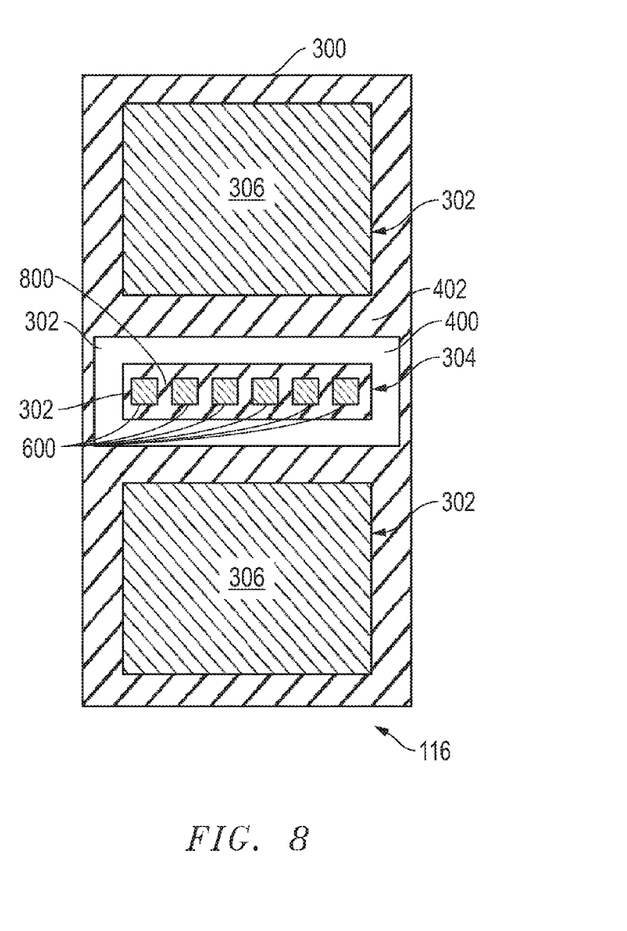
FIG. 8 is a front view of the sensor pad of FIG. 2A having the ring guard electrode of FIG. 7.
Figure 9:
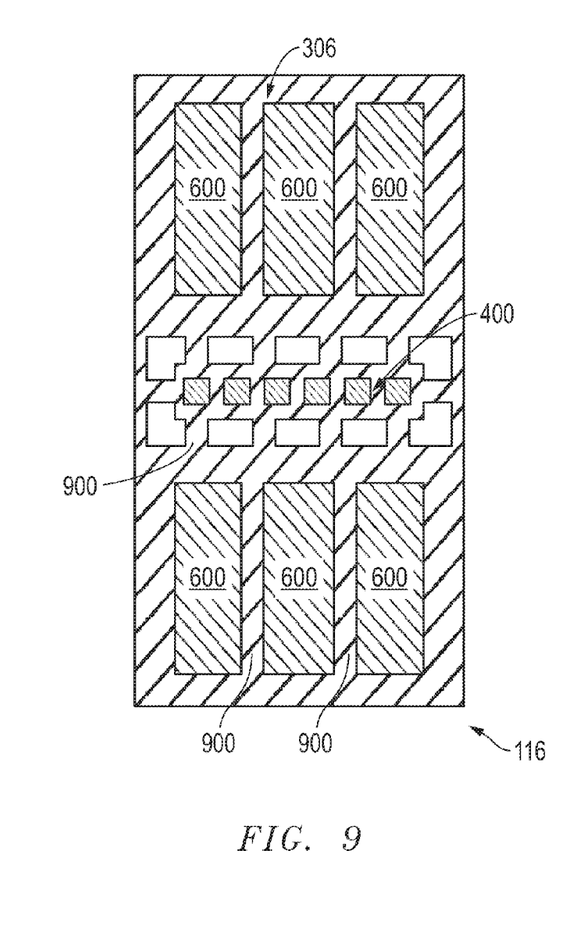
FIG. 9 is a front view of the sensor pad of FIG. 2A having the multi guard electrode of FIG. 6.

FIGS. 8 and 9 show front views of the sensor pad 116 of FIG. 2A. The FIG. 8 shows the sensor pad 116 having two large sensor electrodes 306, a ring type guard electrode 400, and the button electrodes 306 having the sub electrodes 600. The front face 402 of the insulating layer 300 used to house the electrodes 302 may have a complementary shape to house the electrodes 302. As shown in FIG. 8, the front face 402 may have one or more ribs 800 which fit in the gaps between sub electrodes 600 for the button electrodes 304. These ribs 800 may give extra strength to the front face 402 and allow for thinner layers in front of the electrodes 302.

FIG. 8 shows the front face 402 arrangement which is capable of housing the ring guard electrode 700 as shown in FIG. 7. By contrast, FIG. 9 shows the front face 402 arrangement which is capable of housing the series of sub-electrodes 600 of the multi guard electrode 400 of FIG. 6. FIG. 9 shows the sensor pad 116 having the sensor electrodes 306 as being subdivided into sub-electrodes 600, the multi guard electrode 400 being subdivided into sub-electrodes 600, and the button electrodes 306 having the sub electrodes 600. The front face 402 of the insulating layer 300 used to house the electrodes 400 may have a complementary shape to house the electrodes 302. As shown in FIG. 9, the front face 402 may have one or more ribs 900 which fit in the gaps between sub electrodes 600 for the button electrodes 304, the guard electrodes 400 and/or the sensor electrodes 306. These ribs 900 may give extra strength to the front face 402 and allow for thinner layers in front of the electrodes 302.

FIGS. 8 and 9 show where blind holes 500 for button electrodes 304, blind holes 500 for sensor electrodes 306 (which can also be sub-divided) and blind holes 500 for the guard electrode 400 have been drilled into the front face 402. The front face 402 may be less than about 2 mm thick where the button electrode 304 and guard electrodes 400 are received and less than about 3 mm thick where the sensor electrodes 306 are received. The region of the front face 402 where no blind holes 500 are present 26 may have an increased thickness, for example at least about 4 mm thick.

Further changes may be made within the scope of the disclosure. In the examples above, the insulating layer 300 may be part of the front face 402. The insulating layer 302 may also be formed by depositing an insulating material such as hard paint, plastic, peek and the like over the electrodes 302.

Figure 10:
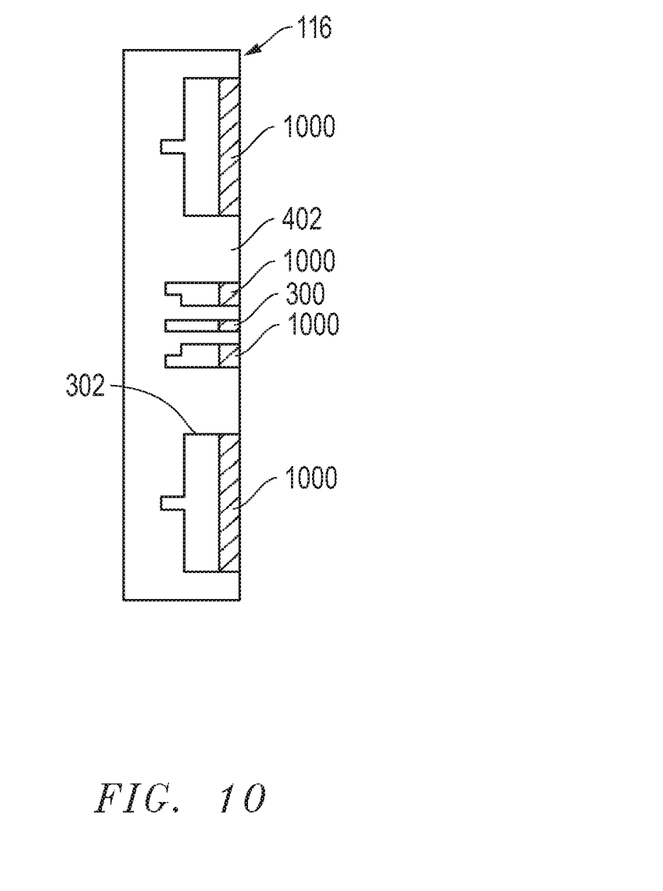
FIG. 10 is a cross-sectional view of a portion of the downhole tool of FIG. 2A, depicting another alternate pad.

Alternatively, the insulating layer 300 may be formed having a modified electrode surface property 1000, as shown in FIG. 10. The modified electrode surface property 1000 may allow the electrodes 302 to become the insulating layer 300, or a portion thereof. The modified electrode surface property 1000 may be formed, for example, by anodization. The sub-divided electrodes can also be formed by completely separate but electrically connected sub-electrodes. Further, some of the electrodes 302, may use the modified electrode surface property 1000 while others may be covered by the insulating layer 300 as described above.

Figure 11:
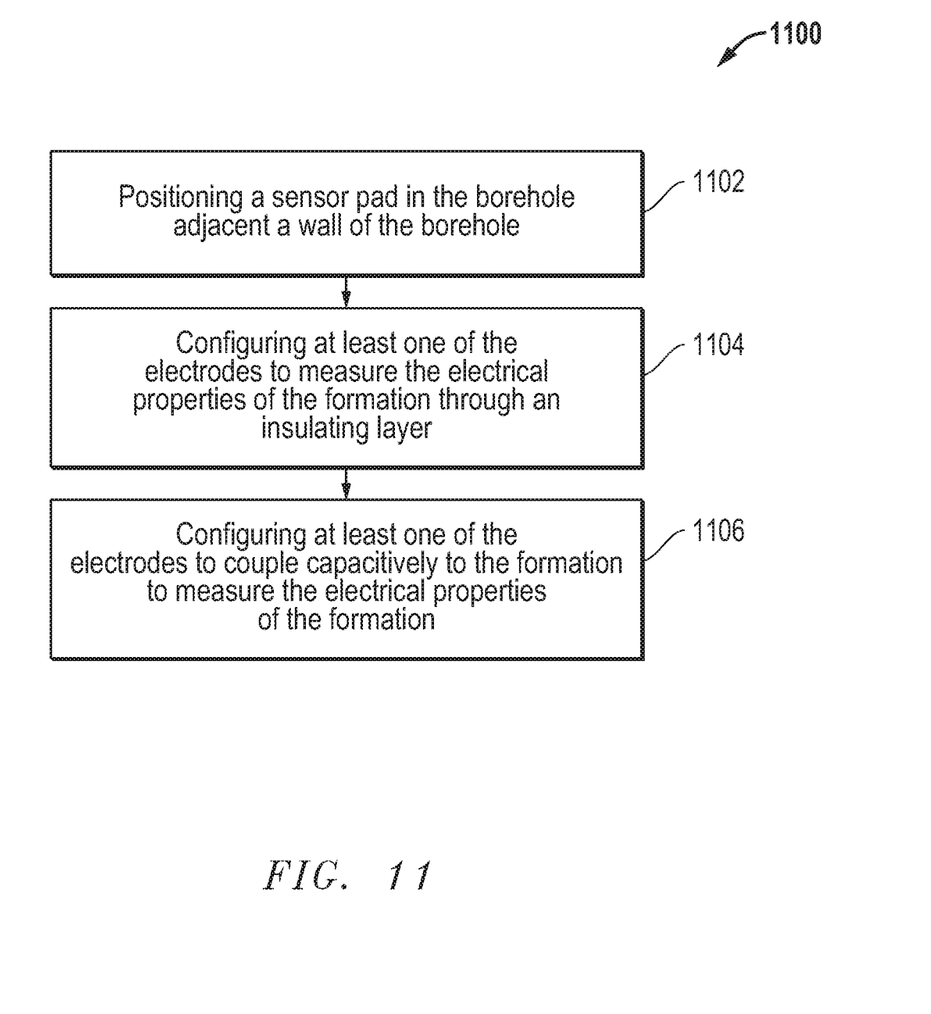
FIG. 11 is a flowchart depicting a method of measuring (e.g., electrical) properties of an underground formation.

FIG. 11 depicts a flowchart 1100 depicting a method for measuring the electrical properties of an underground formation surrounding a borehole. The flow begins at block 1102 wherein a sensor pad is positioned in the borehole adjacent a wall of the borehole. The sensor pad may have an arrangement of electrodes for measuring the electrical properties of the formation mounted on the sensor pad and configured to face the wall of the borehole, and having an insulating layer extending over a substantial portion of at least one electrode facing the wall of the borehole. The flow continues at block 1104 wherein the electrodes are configured to measure the electrical properties of the formation through the insulating layer. The flow may optionally continue at block 1106 wherein at least one of the electrodes are configured to couple capacitively to the formation to measure the electrical properties of the formation.

While the embodiments are described with reference to various implementations and exploitations, it will be understood that these embodiments are illustrative and that the scope of the inventive subject matter is not limited to them. Many variations, modifications, additions and improvements are possible. For example, additional sources and/or receivers may be located about the wellbore to perform seismic operations.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus for measuring electrical properties of an underground formation surrounding a borehole, comprising:
    a downhole tool suitable for operating in the borehole;
    a sensor pad coupled to the downhole tool;
    a plurality of electrodes mounted on the sensor pad and configured to face a wall of the borehole, wherein the plurality of electrodes comprises one or more larger electrodes having a first surface area on a face of the sensor pad and one or more smaller electrodes having a second surface area on the face of the sensor pad, wherein the second surface area is smaller than the first surface area; and
    an insulating layer extending over at least a portion of the plurality of electrodes facing the wall of the borehole, wherein the insulating layer in front of the one or more larger electrodes comprises a greater thickness than the insulating layer in front of the one or more smaller electrodes.

2. The apparatus as claimed in claim 1, wherein the plurality of electrodes are configured to couple capacitively to the formation to measure its electrical properties.

3. The apparatus as claimed in claim 1, further comprising a wear plate for maintaining a minimum standoff between the sensor pad and the wall of the borehole.

4. The apparatus as claimed in claim 1, wherein the insulating layer is formed by depositing an insulating material over at least a portion of the plurality of electrodes, or by modifying the surface properties of the plurality of electrodes to become insulating.

5. The apparatus as claimed in claim 1, wherein the insulating layer comprises a face of the sensor pad formed from an insulating material.

6. The apparatus as claimed in claim 5, wherein each of the plurality of electrodes are mounted in a blind hole formed in the sensor pad.

7. The apparatus as claimed in claim 1, wherein the plurality of electrodes comprises at least one button electrode and at least one return electrode with an optional source electrode and/or a guard electrode.

8. The apparatus as claimed in claim 7, wherein the at least one button electrode is less than two centimeters in diameter.

9. The apparatus as claimed in claim 8, wherein the insulating material extends between the series of interconnected spaced sub-electrodes.

10. The apparatus as claimed in claim 7, wherein the insulating layer extends over a substantial portion of the at least one button electrode facing the wall of the borehole.

11. The apparatus as claimed in claim 7, wherein at least one of the plurality of electrodes comprises a series of interconnected spaced sub-electrodes configured to operate as a single electrode.

12. The apparatus as claimed in any of claims 7, wherein the insulating material has different thicknesses depending on the nature of the sub-electrode.

13. The apparatus as claimed in claim 1, wherein the insulating layer has a thickness of not more than 3 mm.

14. The apparatus as claimed in claim 1, wherein the downhole tool is a wireline tool.

15. The apparatus as claimed in claim 1, wherein the downhole tool is a logging while drilling tool.

16. A method for measuring the electrical properties of an underground formation surrounding a borehole, comprising the steps of:

positioning a downhole tool with a sensor pad thereon in the borehole, the sensor pad having insulation thereon;

positioning the sensor pad in the borehole adjacent a wall of the borehole, the sensor pad having a plurality of electrodes for measuring the electrical properties of the formation mounted in the insulation on the sensor pad and configured to face the wall of the borehole, and having an insulating layer extending over at least a portion of the plurality of electrodes facing the wall of the borehole, wherein the insulating layer in front of an electrode having a larger surface area on a face of the sensor pad has a greater thickness than a thickness of the insulating layer in front of an electrode having a smaller surface area on the face of the sensor pad; and, configuring at least one of the plurality of electrodes to measure the electrical properties of the formation through the insulating layer.

17. The method as claimed in claim 16, further comprising the step of configuring at least one of the plurality of electrodes to couple capacitively to the formation to measure the electrical properties of the formation.

* * * * *